T. A. EDISON.
Electric-Lights.
No. 227,229.  Patented May 4, 1880.
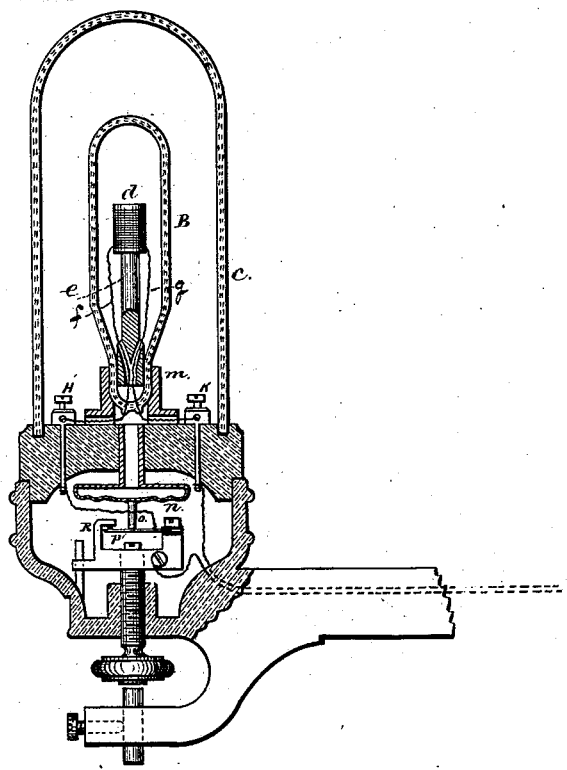
Witnesses
Chas. H. Smith
Geo. T. Pinckney
Inventor
Thomas A. Edison
per Lemuel W. Serrell
atty

UNITED STATES PATENT OFFICE.

THOMAS A. EDISON, OF MENLO PARK, NEW JERSEY.

ELECTRIC LIGHT.

SPECIFICATION forming part of Letters Patent No. 227,229, dated May 4, 1880.

Application filed April 21, 1879.

*To all whom it may concern:*

Be it known that I, THOMAS A. EDISON, of Menlo Park, in the State of New Jersey, have invented an Improvement in Electric Lights, (Case No. 176,) of which the following is a specification.

When platina and other metals that fuse at a high temperature are exposed to high heat and then cooled in the atmosphere they are injured, so that they are not well adapted to use in electric lights for a long period of time.

I inclose the conductor that forms the electric candle in a transparent case and heat the same gradually to expel any gases from the material of the candle. I form a vacuum in the transparent case and then seal the same hermetically, so that all injurious atmospheric influences are avoided.

The invention further consists of a vacuum-receptacle made entirely of glass and sealed by melting the same in combination with an incandescent continuous conductor pyro-insulated.

The invention further consists in winding pyro-insulated wire upon a bottom of a compressed infusible substance, such as lime.

The invention further consists in placing the vacuum-bulb within another glass receptacle, also closed from the air, and employing the expansion of the air between the two receptacles due to the heat of the incandescent bobbin to produce a movement which shall disconnect the lamps from the electric circuit when its temperature is too great.

The drawing shows a section of the apparatus, in which B is the transparent bulb. This bulb is open at the smaller end and the burner *d* inserted, and the open end of the tube is placed in connection with a mercury vacuum-pump, the platina wires *g* and *f* passing through. The burner is connected with a battery and variable-resistance coil while the vacuum is being made. The heat of the bobbin *d* is, in the course of one hour, brought gradually from the temperature of the air to vivid incandescence. When the vacuum is considered practically perfect the open end of the tube is melted and sealed. The platina wires passing through the glass are also sealed.

Thus I am enabled to obtain a nearly-perfect vacuum, which is permanent, and at the same time give the platinum wire a new and unknown property of great value in electric lighting, which is, that a platina wire which melts in the open air at a point where it emits a light equal to four candles will, when operated upon as described, emit a light equal to twenty-five candles without fusion. The reason why the melting-point of the metal is thus raised is, that in the act of making the vacuum with the metal under heat all the gases which are contained in its pores are withdrawn, and when the receptacle is sealed cannot re-enter when cold; hence unequal and sudden expansions cannot take place and the wire is never cracked, but if left uncovered becomes as bright as the most polished silver—an appearance which cannot be given it in any other way. On the other hand, it is known that the metals of the platinum group have, in a surprising degree, the peculiar power of absorbing within their pores many volumes of gas, and it is the sudden expansion of this gas upon a sudden accession of heat that disrupts the wire and produces cracks, which extend nearly to its center when the wire is brought to moderate incandescence in the open air. These cracks set up a great resistance to the passage of the current, and at these points become abnormally heated; hence the platina wire easily melts, whereas no such cracks are noticed when the wire has been operated upon in the vacuum and all its gases pumped out.

*e* is a cylinder, of lime, with a small spool on its extremity, on which the wire is coiled. About thirty feet of platinum or iridium wire coated with magnesia oxide is coiled upon the spool.

The wire may be of any size; but I prefer to use wire .005 of an inch in diameter, which will give a resistance when incandescent of about seven hundred and fifty ohms. By the use of such high-resistant lamps I am enabled to place a great number in multiple arc without bringing the total resistance of all the lamps to such a low point as to require a large main conductor; but, on the contrary, I am enabled to use a main conductor of very moderate dimensions.

Another important point is gained by the use of lamps of high resistance, as the resistance of the wires leading from the main conductors may be of very moderate dimensions; hence can be placed in the pipes already used for gas, and at the same time effect a great saving in the cost of wire.

Still another point gained is, that the high resistance of the lamps allows all to be placed in multiple arc, which is the only method where the maximum economy is attainable, as the lamps, when connected to the circuit, draw from the central station just sufficient current to maintain it at the proper temperature, and if by accident or want of regularity in the main current the strength of the current should increase abnormally, the excess of heat sets the thermal regulator in motion and disconnects the lamp entirely from the circuit, thus stopping all further consumption of energy until the temperature of the lamp is reduced to its normal conditions. I will state that these changes are not perceptible to the eye; hence the lamp cannot consume any more energy than that required to cause it to emit a certain light.

No loss in economy occurs by using so large a resistance, because the loss of energy is proportionate to the radiating-surface exposed to the air and its temperature, and is independent of the resistance of the wire forming such surface.

$m$ is a lime cup, into which the small end of the vacuum-burner is held. The platina wires pass under it to the binding-posts H K.

$n$ is the thermal regulator, operated by the expansion of the air. When the temperature of the air between the bulbs becomes too great, the diaphragm bulges outward and the point $o$ separates the spring $p$ from R and disconnects the lamp from the circuit, where it remains until the temperature is reduced to the normal condition.

The spark upon the point is very small, as I employ constant field-magnets at the central station; hence the powerful sparks due to the secondary current set up by the weakening of the powerful field-magnet is avoided.

I will mention that the second globe $c$ might be made entirely of glass, and the aneroid-diaphragm, provided with a platina tube, be sealed in the glass, or the aneroid itself be made of glass.

I am aware that an electric lamp has been made in which glass has been combined with other substances to form a case, and that efforts have been made to keep such case air-tight; but the changes of temperature have prevented the maintenance of a vacuum or the exclusion of the atmosphere. In my improvement the chamber containing the light is made entirely of glass, and I am able to obtain and maintain a vacuum, because there is no substance joined to the glass; hence the entire chamber can be hermetically sealed and the conductors of metal passing through the glass and around which the glass is melted are so small as not to injure the glass by their expansion.

I am also aware that carbon has been heated in the presence of both liquid and gaseous materials for changing its character and adapting it to an electric light. In my present invention the gaseous materials contained in metallic wire are driven off by the action of heat evolved by an electric current while the wire is in a vacuum, so that the pores of the metal are not filled with any extraneous substance; but, on the contrary, the metal is solidified by the removal of extraneous matter and the pores closed.

In my application No. 166 I have set forth an electric lamp formed of pyro-insulated metal. I do not, therefore, claim the same herein.

I claim as my invention—

1. In an electric lamp, the combination, with a hermetically-sealed vacuum-chamber made entirely of glass, of metallic conductors passing through the glass and around which the glass is melted, and an incandescent conductor placed in the electric circuit, substantially as set forth.

2. The method herein specified of treating metallic conductors for electric lamps, consisting in inclosing the conductor in a glass case, exhausting the atmosphere from such case, heating the conductor by an electric current, and then hermetically sealing such glass case, substantially as set forth.

3. The combination, in an electric lamp, of a hermetically-sealed vacuum-case made entirely of glass, conducting-wire passing through the glass and around which the glass is melted, and an incandescent body formed of a pyro-insulated wire and an infusible core for the same, substantially as set forth.

4. The combination of a transparent vacuum-case, a continuous conductor forming an electric candle, and a second transparent case forming a closed chamber, for the purpose set forth.

5. The combination of the conductor $d$, forming an electric candle, the transparent sealed case B, the transparent case $c$, inclosing the case B, and the thermostatic regulator $n\ o\ p$ R, substantially as set forth.

Signed by me this 12th day of April, A. D. 1879.

THOMAS A. EDISON.

Witnesses:
S. L. GRIFFIN,
EDWIN M. FOX.